(12) United States Patent
Lamb

(10) Patent No.: US 7,388,175 B2
(45) Date of Patent: Jun. 17, 2008

(54) TEMPERATURE-LIMITING DEVICE

(75) Inventor: Stuart Lamb, Redditch (GB)

(73) Assignee: Ceramaspeed Limited (GB)

( * ) Notice: Subject to any disclaimer, the term of this patent is extended or adjusted under 35 U.S.C. 154(b) by 63 days.

(21) Appl. No.: 10/542,271

(22) PCT Filed: Jan. 16, 2004

(86) PCT No.: PCT/GB2004/000178

§ 371 (c)(1),
(2), (4) Date: Mar. 13, 2006

(87) PCT Pub. No.: WO2004/066049

PCT Pub. Date: Aug. 5, 2004

(65) Prior Publication Data

US 2006/0231545 A1   Oct. 19, 2006

(30) Foreign Application Priority Data

Jan. 18, 2003   (GB) ................................ 0301167.3

(51) Int. Cl.
*H05B 3/68* (2006.01)
(52) U.S. Cl. ................ 219/448.11; 219/460.1
(58) Field of Classification Search .. 219/443.1–468.2, 219/538, 541; 337/393, 394
See application file for complete search history.

(56) References Cited

U.S. PATENT DOCUMENTS

| 3,666,920 | A |   | 5/1972 | Price |   |
|---|---|---|---|---|---|
| 4,394,646 | A | * | 7/1983 | Gossler | ...................... 340/594 |
| 5,393,958 | A | * | 2/1995 | Gross et al. | .............. 219/461.1 |
| 5,420,398 | A | * | 5/1995 | Petri et al. | ................... 219/505 |
| 6,121,587 | A |   | 9/2000 | Leiprecht et al. |   |
| 6,756,569 | B2 | * | 6/2004 | Bates et al. | .............. 219/461.1 |

FOREIGN PATENT DOCUMENTS

| EP | 0114307 | 12/1983 |
|---|---|---|
| EP | 0943870 | 9/1999 |
| GB | 2186167 | 8/1987 |
| GB | 2225920 | 6/1990 |

OTHER PUBLICATIONS

International Search Report May 18, 2004.

* cited by examiner

*Primary Examiner*—S. Paik
(74) *Attorney, Agent, or Firm*—Ira S. Dorman

(57) ABSTRACT

A temperature-limiting device (14) is provided for an electric heater (2), the heater (2) being located behind a heatable surface (4) and comprising a dish-like support (6) having therein at least one electric heating element (12) having first and second terminal regions (12A, 12B). The device comprises thermally responsive bimetallic means (22) provided in a housing (16). The housing (16) is supported at a peripheral region of the heater (2), at least partially externally of the support (6). The bimetallic means (22) is thermally coupled with the heater (2) to sense heat generated therein by the heating element (12) and to respond at a predetermined temperature to operate at least one switch means (18) located in the housing (16). The housing (16) has first and second sides (32, 38) opposite each other provided with first and second electrically conductive elements (34, 40) accessible at the sides of the housing (16), externally of the dish-like support (6), for electrical connection to the terminal regions (12A, 12B) of the heating element (12).

39 Claims, 3 Drawing Sheets

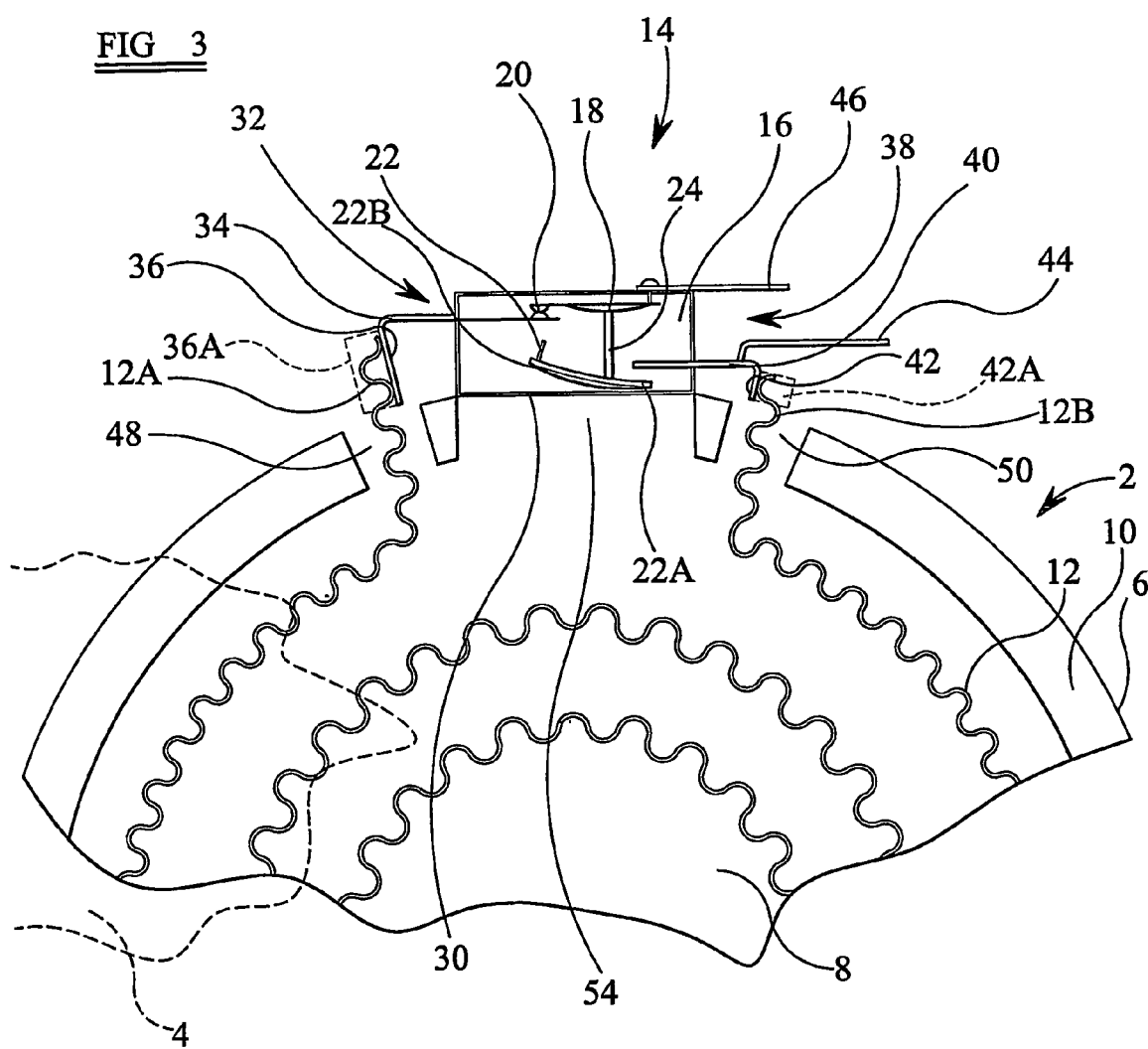

TEMPERATURE-LIMITING DEVICE

This invention relates to a temperature-limiting device for an electric heater, for example an electric heater for use in a cooking appliance. The invention also relates to an electric heater provided with the temperature-limiting device.

It is well known to provide a temperature-limiting device for an electric heater. Such an electric heater is typically arranged for location behind a surface to be heated, such as a glass-ceramic cooking surface, and generally comprises a dish-like support having therein at least one electric heating element. In particular, the temperature-limiting device comprises thermally responsive bimetallic means provided in a housing and supported on the heater in such a way as to respond, at a particular temperature of the heater, to operate one or more switch means located in the housing.

It is necessary to electrically connect a voltage source to the heating element or elements and to arrange for the temperature-limiting device to operate to interrupt the voltage supply when a predetermined temperature is reached.

It is known to provide a terminal block externally on the dish-like support of the heater. Such terminal block is connected to terminal regions of the heating element or elements and external leads are arranged from the terminal block to the voltage source and to the temperature-limiting device. Such an arrangement is inconvenient and expensive to implement.

It is also known to provide direct electrical connection between terminal regions of a heating element and connecting elements on a temperature-limiting device, such connecting elements being accessible in the region of a front face of a housing of the temperature-limiting device adjacent to the heater. In this known arrangement, the temperature-limiting device comprises a differentially-expanding rod and tube assembly, which extends at least partly across the heater from the housing and operates one or more switch means located in the housing.

It is therefore an object of the present invention to overcome or at least ameliorate the disadvantages of the above arrangements.

According to the present invention there is provided a temperature-limiting device for an electric heater, the heater being adapted for location behind a surface to be heated and comprising a dish-like support having therein at least one electric heating element having a first terminal region and a second terminal region, the device comprising thermally responsive bimetallic means provided in a housing, the housing being adapted to be supported at a peripheral region of the heater, at least partially externally of the dish-like support, the thermally responsive bimetallic means being adapted to be thermally coupled with the heater to sense heat generated therein by the at least one heating element and to respond at a predetermined temperature to operate at least one switch means located in the housing, the housing having a first side and a second side opposite to each other provided with a first electrically conductive element and a second electrically conductive element accessible at the sides of the housing, externally of the dish-like support, for electrical connection to the first and second terminal regions respectively of the at least one electric heating element.

The electrical connection of the first and second electrically conductive elements to the respective first and second terminal regions of the at least one heating element may be by means of direct contact between the electrically conductive elements and the terminal regions.

The first and second terminal regions of the at least one heating element may extend through apertures in the dish-like support for electrical connection to the first and second electrically conductive elements.

The first and second terminal regions of the at least one heating element may be electrically connected to the first and second electrically conductive elements by welding.

At least one of the first and second electrically conductive elements may be provided with a portion selected from a strip-like portion and a flanged portion for securing to at least one of the first and second terminal regions of the at least one heating element.

The strip-like portion may have a plane thereof disposed in any desired orientation from a vertical plane to a horizontal plane.

The flanged portion may have a wall portion with a dependant laterally-directed ledge portion.

At least one of the first and second electrically conductive elements may have the portion extending in a direction towards the heater and at a predetermined angle relative to a rim of the dish-like support.

Alternatively, one or both of the first and second electrically conductive elements may be arranged for electrical connection to a terminal region selected from the respective first and second terminal regions of the at least one heating element by way of at least one electrically conductive link, for example of a form selected from wire and strip form.

The at least one electrically conductive link may extend through apertures in the dish-like support for electrical connection to the first and second electrically conductive elements.

The at least one electrically conductive link may be electrically connected to the first and second electrically conductive elements by welding.

At least one of the first and second electrically conductive elements may be provided with a portion selected from a strip-like portion and a flanged portion for securing to the at least one electrically conductive link.

The strip-like portion may have a plane thereof disposed in any desired orientation from a vertical plane to a horizontal plane.

The flanged portion may have a wall portion with a dependant laterally-directed ledge portion.

At least one of the first and second electrically conductive elements may have the portion extending in a direction towards the heater and at a predetermined angle relative to a rim of the dish-like support.

The first and second electrically conductive elements may extend laterally at the first and second opposite sides of the housing.

The at least one electric heating element may be of corrugated ribbon form supported upstanding on edge in the dish-like support.

The first and second terminal regions of the at least one electric heating element of corrugated ribbon form may be connected directly to the first and second electrically conductive elements and have an orientation substantially the same as that of the at least one electric heating element as supported in the dish-like support, or may be twisted through an appropriate angle for connection to the first and second electrically conductive elements.

The first and second electrically conductive elements may comprise metal, such as stainless steel or nickel-plated steel.

The first electrically conductive element may be electrically connected to the at least one switch means in the housing and the second electrically conductive element may be adapted for electrical connection to an external lead wire.

At least a third electrically conductive terminal may be provided at the first or second sides of the housing, and may be arranged for electrical connection to the at least one switch means in the housing and may be adapted for electrical connection to an external lead wire.

The housing of the temperature-limiting device may comprise ceramic material.

The thermally responsive bimetallic means may be thermally coupled with the heater by means of an elongate thermally conductive member, such as of metal, and such as of rod, beam or tube form, which is adapted to extend from the housing at least partly across the heater and overlying the at least one heating element. Such elongate member may have an end thereof in direct or indirect contact with the bimetallic means.

Alternatively, the housing may have a front face thereof adapted to be exposed to thermal radiation from the heater, through an aperture provided in a rim of the dish-like support, the bimetallic means being either adapted to be directly exposed to the thermal radiation from the heater, or to be in thermo-conducting relationship with thermally conducting means directly exposed, at the front face of the housing, to the thermal radiation from the heater.

The housing may be adapted to be partly inserted into the heater through the aperture provided in the rim of the dish-like support.

The bimetallic means may comprise a snap disc, operating at a predetermined temperature to displace electric contacts of the at least one switch means. The snap disc may operate to displace the electric contacts by way of an intermediate member, such as of rod form.

Alternatively, the bimetallic means may comprise a member, such as of strip form, which undergoes increasing deflection with increasing temperature and operates to cause displacement of electric contacts of the at least one switch means at a predetermined temperature. Such electric contacts may be incorporated in a snap switch arrangement.

The present invention also provides an electric heater provided with the aforementioned temperature-limiting device.

For a better understanding of the present invention and to show more clearly how it may be carried into effect, reference will now be made, by way of example, to the accompanying drawings in which:

FIG. 3 is a plan view of an arrangement of part of an electric heater provided with an alternative embodiment of a temperature-limiting device according to the present invention.

Figure 1:
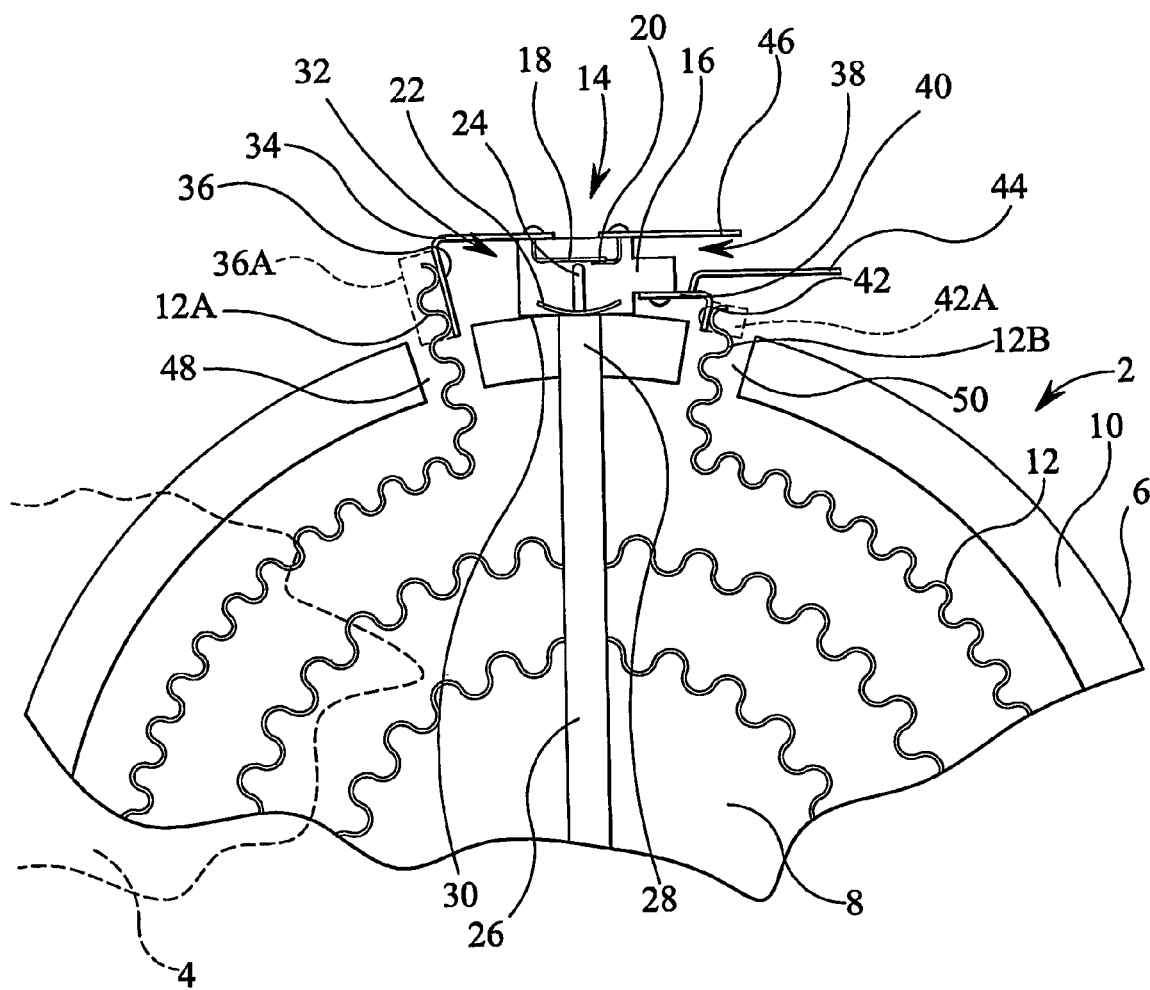
FIG. 1 is a plan view of an arrangement of part of an electric heater provided with an embodiment of a temperature-limiting device according to the present invention.

Referring to FIG. 1, an electric heater 2 is arranged for location beneath a surface 4 to be heated. The surface 4 may be a cooking surface and may comprise glass-ceramic material.

The heater 2 comprises a dish-like support 6, such as of metal, containing a layer 8 of thermal and electrical insulation material, such as microporous thermal and electrical insulation material. A peripheral wall 10 of thermal insulation material is provided in the dish-like support 6 and contacts the underside of the surface 4 to be heated.

At least one radiant electric heating element 12 is arranged inside the dish-like support 6. As shown in FIG. 1, heating element 12 comprises a corrugated metal ribbon arranged upstanding on edge in the dish-like support 6. However, other forms of heating element could be provided.

A temperature-limiting device 14 is provided for the heater 2 and comprises a housing 16, suitably of ceramic material, incorporating at least one switch means 18 having switch contacts 20. The housing 16 is secured to the periphery of the heater 2, against or adjacent to a rim of the dish-like support 6.

A thermally responsive bimetallic means 22, in the form of a snap disc, is provided inside the housing 16 and is arranged to operate the switch means 18 by way of a rod 24, to open and close the switch contacts 20.

An elongate thermally conductive member 26 has an end 28 thereof thermally coupled directly or indirectly with the bimetallic snap disc 22 and extends from a front face 30 of the housing 16, through the rim of the dish-like support 6 and the peripheral wall 10 and at least partly across the heater 2, overlying the at least one heating element 12. The elongate thermally conductive member 26 comprises metal and is suitably in the form of a rod, beam or tube.

The housing 16 has a first side 32 from which laterally extends a first electrically conductive element 34 having a portion 36 extending in a direction towards the heater at a predetermined angle relative to the rim of the dish-like support 6. The first electrically conductive element 34 is electrically connected to the switch means 18.

The housing 16 has a second side 38 from which laterally extends a second electrically conductive element 40 having a portion 42 extending in a direction towards the heater at a predetermined angle relative to the rim of the dish-like support 6. The second electrically conductive element 40 is provided with a terminal portion 44 for electrical connection to an external lead wire (not shown), from a power supply.

A third electrically conductive element 46 is also provided on the housing 16 and extending laterally at the second side 38 thereof. This third electrically conductive element 46 is also electrically connected to the switch means 18 and is adapted to be connected to a further external lead wire (not shown), from the power supply.

The first, second and third electrically conductive elements 34, 40 and 46 are accessible at the sides 32, 38 of the housing 16 and suitably comprise metal, such as stainless steel or nickel-plated steel. They are suitably of strip form.

The corrugated ribbon heating element 12 has first and second terminal regions 12A and 12B thereof extending through apertures 48, 50 in the peripheral wall 10 and the rim of the dish-like support 6, of the heater 2. If desired, the terminal regions 12A and 12B need not be corrugated. The first terminal region 12A of the heating element 12 is welded directly to the portion 36 of the first electrically conductive element 34 and the second terminal region 12B of the heating element 12 is welded directly to the portion 42 of the second electrically conductive element 40. The first and second electrically conductive elements 34, 40 are readily accessed at the sides 32, 38 of the housing 16 by the jaws of a pincer welding apparatus (not shown), to effect the necessary welding operations.

The portions 36 and 42 of the first and second electrically conductive elements 34, 40 may comprise wall portions and have dependant outwardly-directed ledge portions 36A and 42A respectively, such that the first and second electrically conductive elements 34, 40 have a resultant flanged form. The ledge portions 36A and 42A serve to support the first and second terminal regions 12A, 12B of the heating element 12 during the welding operation and may each be provided with an upstanding lip (not shown) on the outer edge thereof to assist retention of the terminal regions 12A, 12B on the ledge portions 36A, 42A prior to welding. The lips may extend upwardly by about 2 mm and such that they do not inhibit access by the welding apparatus. Alternatively, other means (not shown) may be provided to retain the terminal regions 12A, 12B on the ledge portions 36A, 42A prior to welding.

The portions 36 and 42 of the first and second electrically conductive elements 34, 40 could be of simple strip form, having a plane thereof disposed in any desired orientation from a vertical plane to a horizontal plane.

When the heater 2 is energised for operation, heat is conducted along the elongate thermally conductive member 26 to the bimetallic snap disc 22. When a predetermined temperature is reached, the snap disc 22 deflects and the rod 24 is urged towards the switch means 18, resulting in opening of the switch contacts 20 and de-energising of the heater. When the heater cools, the bimetallic snap disc returns to its original state, allowing the switch contacts 20 to close and the heater to be energised again.

Figure 2:
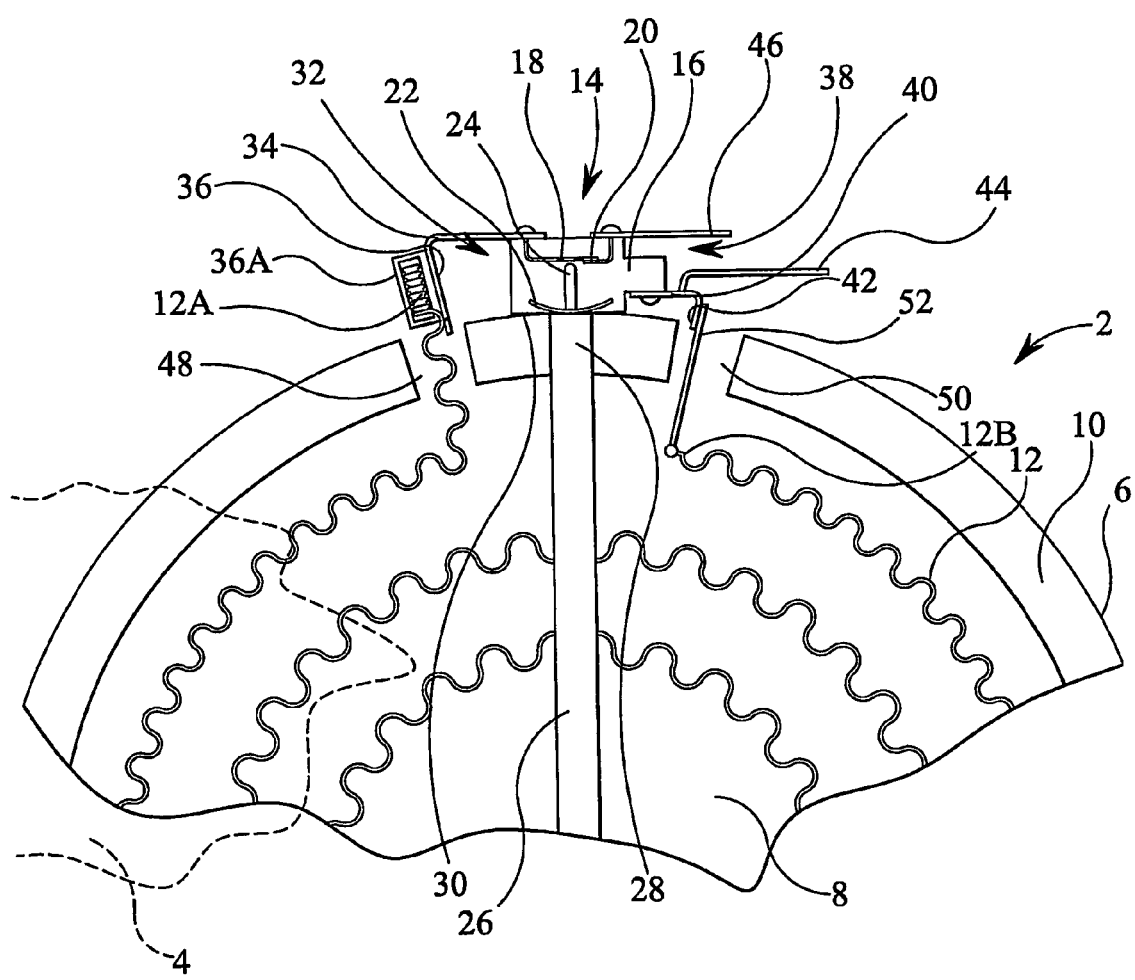
FIG. 2 is a plan view of a modification of the arrangement of FIG. 1.

As shown in FIG. 1, the first and second terminal regions 12A, 12B of the corrugated ribbon heating element 12 have an orientation substantially the same as that of the heating element 12 as supported in the dish-like support 6. If desired, however, the first and/or second terminal regions 12A, 12B of the heating element 12 may be twisted through an appropriate angle for connection to the first and/or second electrically conductive elements 34, 40 in a different plane. This is illustrated in FIG. 2, where the first terminal region 12A of the heating element 12 is twisted and welded to the outwardly-directed ledge portion 36A of the portion 36 of the first electrically conductive element 34. The second terminal region 12B of the heating element 12 can be similarly arranged.

Instead of the first and second terminal regions 12A, 12B of the heating element 12 being directly welded to the first and second electrically conductive elements 34, 40, one or more intermediate electrically conductive links, such as of wire or strip form, may be provided connecting the first and/or second terminal regions 12A, 12B of the heating element 12 to the first and/or second electrically conductive elements 34, 40 respectively. This is illustrated in FIG. 2, where the second terminal region 12B of the heating element 12 is welded to one end of a link 52 inside the heater 2. The link 52 passes through aperture 50 in the peripheral wall 10 and the rim of the dish-like support 6 of the heater 2 and is welded at its opposite end to the portion 42 of the second electrically conductive element 40. The first terminal region 12A of the heating element 12 can be similarly treated.

The provision of one or more electrically conductive links, such as the link 52, is particularly advantageous when a heating element of lamp form is provided and where terminals on an envelope of the lamp cannot be connected directly to the first and second electrically conductive elements 34, 40.

Referring now to FIG. 3, this shows an electric heater 2 provided with a temperature-limiting device 14 and which is constructed in substantially identical manner to that of FIG. 1, with the exception of the operating components of the temperature-limiting device 14. In the arrangement of FIG. 3, the thermally responsive bimetallic means 22 comprises a bimetallic strip secured at one end 22A to the housing 16 and has a free end 22B which gradually displaces or creeps in a direction towards the switch means 18 as its temperature increases. Such displacement or creeping is transmitted by the rod 24 to the switch means 18. Here the switch means 18 comprises a snap switch arrangement and, at a particular displacement or extent of creeping with temperature of the bimetallic strip 22, the contacts 20 of the switch means 18 snap open, resulting in de-energising of the heater 2. On cooling, the bimetallic strip 22 gradually returns to its original position and the contacts 20 of the switch means 18 snap shut, allowing further energising of the heater 2.

Although an elongate thermally conductive member, such as the member 26 of FIG. 1, could be provided to conduct heat generated in the heater 2 to the bimetallic strip 22, this is not essential. As shown in FIG. 3, the front face 30 of the housing 16 is arranged to be exposed to thermal radiation from inside the heater 2 through an aperture 54 provided in the peripheral wall 10 and the rim of the dish-like support 6. If desired, the housing 16 could be partly inserted into the aperture 54.

The front face 30 of the housing 16 may be provided with an aperture to expose the bimetallic strip 22 to thermal radiation from within the heater 2, or may comprise or include a thermally conductive material thermally coupled to the bimetallic strip 22.

The alternative arrangements, shown in FIG. 2, for connecting the terminal regions 12A, 12B of the heating element 12 to the first and second electrically conductive elements 34, 40, are also equally applicable to the heater 2 of FIG. 3.

The invention claimed is:

1. An electric heater (2) adapted for location behind a surface (4) to be heated and comprising a dish-like support (6) having therein at least one electric heating element (12) having a first terminal region (12A) and a second terminal region (12B), and a temperature-limiting device (14) having a thermally responsive bimetallic means (22) provided in a housing (16), the housing (16) being adapted to be supported at a peripheral region of the heater (2), at least partially externally of the dish-like support (6), the thermally responsive bimetallic means (22) being thermally coupled with the heater (2), by means of an elongate thermally conductive member (26) which extends from the housing (16) at least partly across the heater (2) and overlying the at least one heating element (12) to sense heat generated therein by the at least one heating element (12) and to respond at a predetermined temperature to operate at least one switch means (18) located in the housing (16), the housing (16) having a first side (32) and a second side (38) opposite to each other provided with a first electrically conductive element (34) and a second electrically conductive element (40) accessible at the sides (32, 38) of the housing (16), externally of the dish-like support (6), wherein the first and second terminal regions (12A, 12B) respectively of the at least one electric heating element (12) are electrically connected to the first electrically conductive element (34) and the second electrically conductive element (40).

2. An electric heater as claimed in claim 1, wherein electrical connection of the first and second electrically conductive elements (34, 40) to the respective first and second terminal regions (12A, 12B) of the at least one heating element (12) is by means of direct contact between the electrically conductive elements (34, 40) and the terminal regions (12A, 12B).

3. An electric heater as claimed in claim 1, wherein the first and second terminal regions (12A, 12B) of the at least one heating element (12) extend through apertures (48, 50) in the dish-like support (6) for electrical connection to the first and second electrically conductive elements (34, 40).

4. An electric heater as claimed in claim 1, wherein the first and second terminal regions (12A, 12B) of the at least one heating element (12) are electrically connected to the first and second electrically conductive elements (34, 40) by welding.

5. An electric heater as claimed in claim 1, wherein at least one of the first and second electrically conductive elements (34, 40) is provided with a portion (36, 42) selected from a strip-like portion and a flanged portion for securing to at least one of the first and second terminal regions (12A, 12B) of the at least one heating element (12).

6. An electric heater as claimed in claim 5, wherein the strip-like portion has a plane thereof disposed in any desired orientation from a vertical plane to a horizontal plane.

7. An electric heater as claimed in claim 5, wherein the flanged portion has a wall portion with a dependant laterally-directed ledge portion (36A, 42A).

8. An electric heater as claimed in claim 5, wherein at least one of the first and second electrically conductive elements (34, 40) has the portion (36, 42) extending in a direction towards the heater (2) and at a predetermined angle relative to a rim of the dish-like support (6).

9. An electric heater as claimed in claim 1, wherein one of the first and second electrically conductive elements (34, 40) is arranged for electrical connection to a terminal region selected from the respective first and second terminal regions (12A, 12B) of the at least one heating element (12) by way of at least one electrically conductive link (52).

10. An electric heater as claimed in claim 1, wherein both of the first and second electrically conductive elements (34, 40) are arranged for electrical connection to the respective first and second terminal regions (12A, 12B) of the at least one heating element (12) by way of at least one electrically conductive link (52).

11. An electric heater as claimed in claim 9, wherein the at least one electrically conductive link (52) is of a form selected from wire and strip form.

12. An electric heater as claimed in claim 9, wherein the at least one electrically conductive link (52) extends through apertures (48, 50) in the dish-like support (6) for electrical connection to the first and second electrically conductive elements (34, 40).

13. An electric heater as claimed in claim 9, wherein the at least one electrically conductive link (52) is electrically connected to the first and second electrically conductive elements (34, 40) by welding.

14. An electric heater as claimed in claim 9, wherein at least one of the first and second electrically conductive elements (34, 40) is provided with a portion (36, 42) selected from a strip-like portion and a flanged portion for securing to the at least one electrically conductive link (52).

15. An electric heater as claimed in claim 14, wherein the strip-like portion has a plane thereof disposed in any desired orientation from a vertical plane to a horizontal plane.

16. An electric heater as claimed in claim 14, wherein the flanged portion has a wall portion with a dependant laterally-directed ledge portion (36A, 42A).

17. An electric heater as claimed in claim 9, wherein at least one of the first and second electrically conductive elements (34, 40) has the portion (36, 42) extending in a direction towards the heater (2) and at a predetermined angle relative to a rim of the dish-like support (6).

18. An electric heater as claimed in claim 1, wherein the first and second electrically conductive elements (34, 40) extend laterally at the first and second opposite sides (32, 38) of the housing (16).

19. An electric heater as claimed in claim 1, wherein the at least one electric heating element is of corrugated ribbon form (12) supported upstanding on edge in the dish-like support (6).

20. An electric heater as claimed in claim 19, wherein the first and second terminal regions (12A, 12B) of the at least one electric heating element of corrugated ribbon form (12) are connected directly to the first and second electrically conductive elements (34, 40) and have an orientation substantially the same as that of the at least one electric heating element (12) as supported in the dish-like support (6).

21. An electric heater as claimed in claim 19, wherein the first and second terminal regions (12A, 12B) of the at least one electric heating element of corrugated ribbon form (12) are connected directly to the first and second electrically conductive elements (34, 40) and are twisted through an appropriate angle for connection to the first and second electrically conductive elements (34, 40).

22. An electric heater as claimed in claim 1, wherein the first and second electrically conductive elements (34, 40) comprise metal.

23. An electric heater as claimed in claim 22, wherein the metal is selected from stainless steel and nickel-plated steel.

24. An electric heater as claimed in claim 1, wherein the first electrically conductive element is electrically connected to the at least one switch means (18) in the housing (16) and the second electrically conductive element is adapted for electrical connection to an external lead wire.

25. An electric heater as claimed in claim 1, wherein at least a third electrically conductive terminal (24) is provided at a side selected from the first and second sides (32, 38) of the housing (16).

26. An electric heater as claimed in claim 25, wherein the at least third electrically conductive terminal (24) is arranged for electrical connection to the at least one switch means (18) in the housing (16).

27. An electric heater as claimed in claim 25 wherein the at least third electrically conductive terminal (24) is arranged for electrical connection to an external lead wire.

28. An electric heater as claimed in claim 1, wherein the housing (16) of the temperature-limiting device (14) comprises ceramic material.

29. An electric heater as claimed in claim 1, wherein the elongate member (26) is of metal.

30. An electric heater as claimed in claim 1, wherein the elongate member (26) is of a form selected from rod, beam and tube form.

31. An electric heater as claimed in claim 1, wherein the elongate member (26) has an end (28) thereof in direct contact with the bimetallic means (22).

32. An electric heater as claimed in claim 1, wherein the elongate member (26) has an end (28) thereof in indirect contact with the bimetallic means (22).

33. An electric heater as claimed in claim 1, wherein the bimetallic means (22) comprises a snap disc (22), operating at a predetermined temperature to displace electric contacts of the at least one switch means (18).

34. An electric heater as claimed in claim 33, wherein the snap disc (22) operates to displace the electric contacts by way of an intermediate member (24).

35. An electric heater as claimed in claim 34, wherein the intermediate member (24) is of rod form.

36. An electric heater as claimed in claim 1, wherein the bimetallic means (22) comprises a member which undergoes increasing deflection with increasing temperature and operates to cause displacement of electric contacts of the at least one switch means (18) at a predetermined temperature.

37. An electric heater as claimed in claim 36, wherein the member which undergoes increasing deflection with increasing temperature is of strip form.

38. An electric heater as claimed in claim 36, wherein the electric contacts are incorporated in a snap switch arrangement.

39. An electric heater as claimed in claim 1, wherein the housing (16) is adapted to be partly inserted into the heater (2) through an aperture (54) provided in a rim of the dish-like support (6).

* * * * *